Oct. 19, 1943.  C. H. JELLEY  2,332,229
MICROMETER
Filed Jan. 16, 1943  3 Sheets-Sheet 1
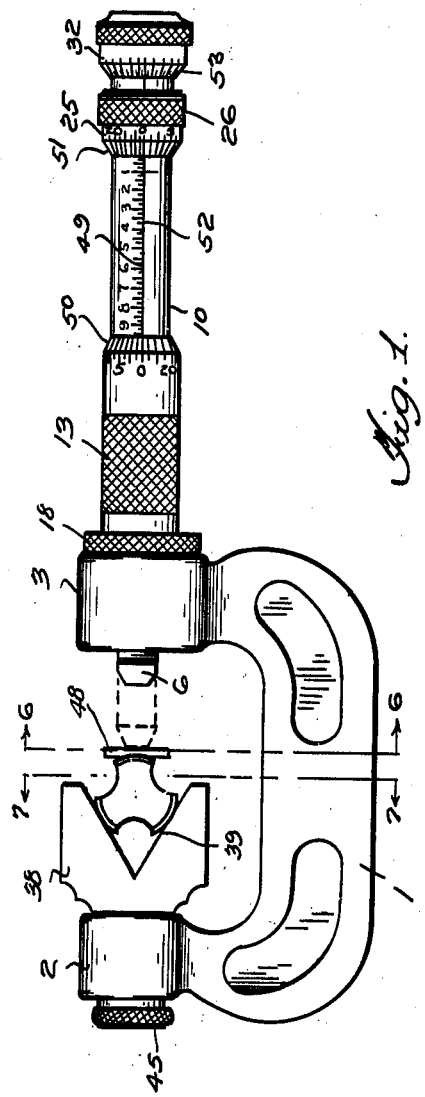
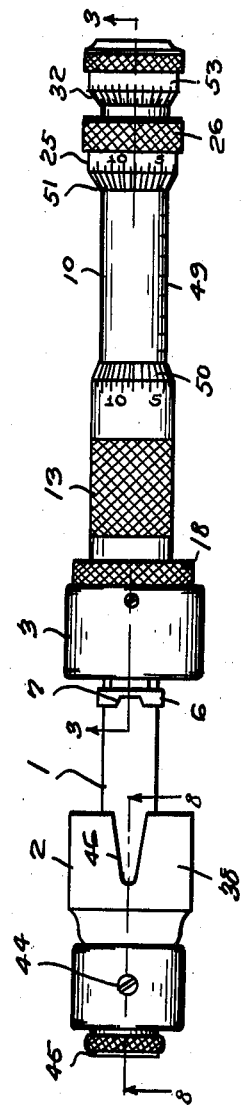
Inventor
Cleveland H. Jelley
By Clarence A. O'Brien
and Harvey B. Jacobson
Attorneys Oct. 19, 1943.  C. H. JELLEY  2,332,229
MICROMETER
Filed Jan. 16, 1943  3 Sheets-Sheet 2
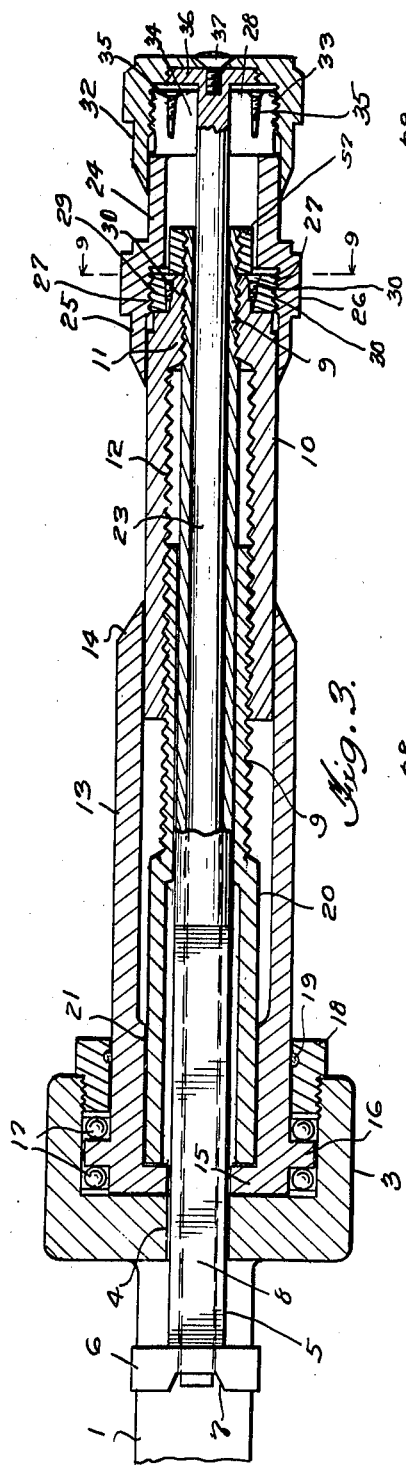
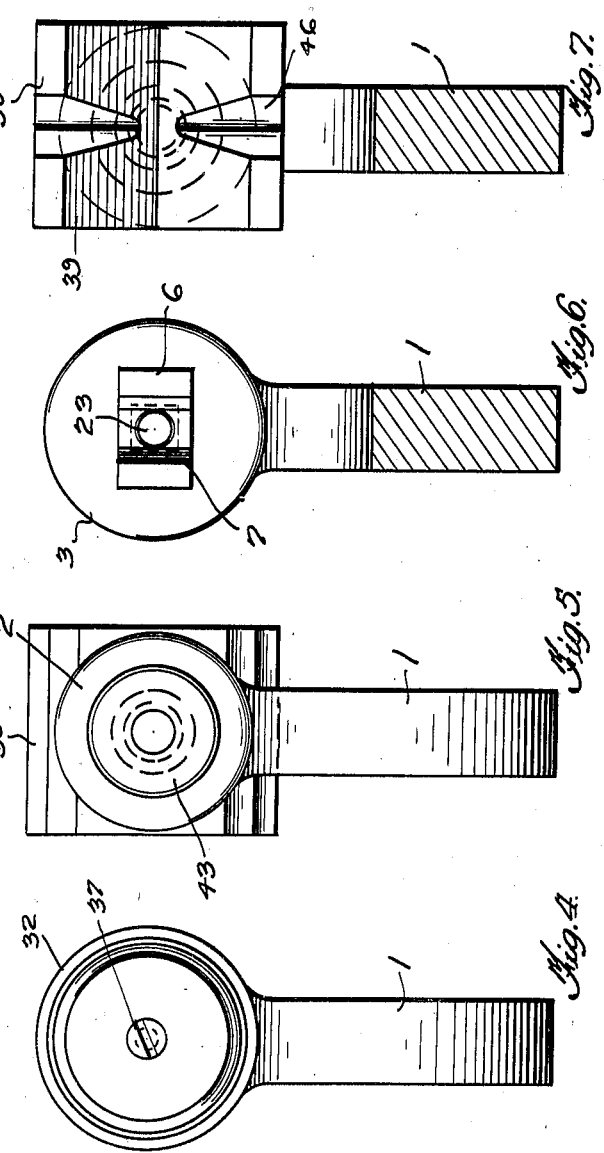
Inventor
Cleveland H. Jelley
By Clarence A. O'Brien
and Harvey B. Jacobson
Attorneys

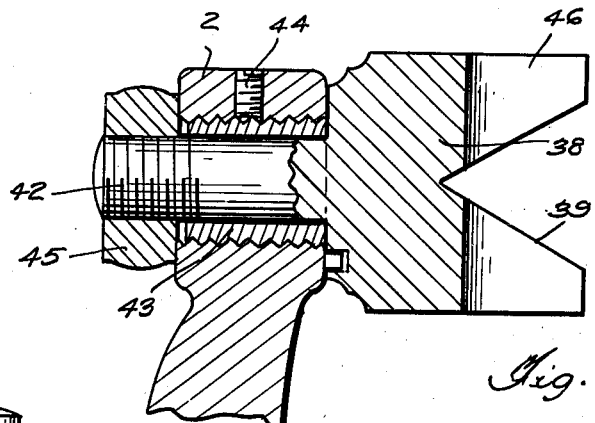
Fig. 8.
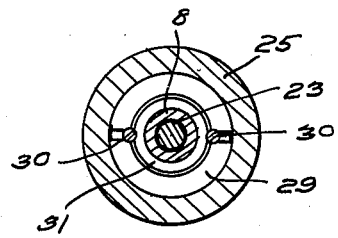
Fig. 9.
Fig. 10.
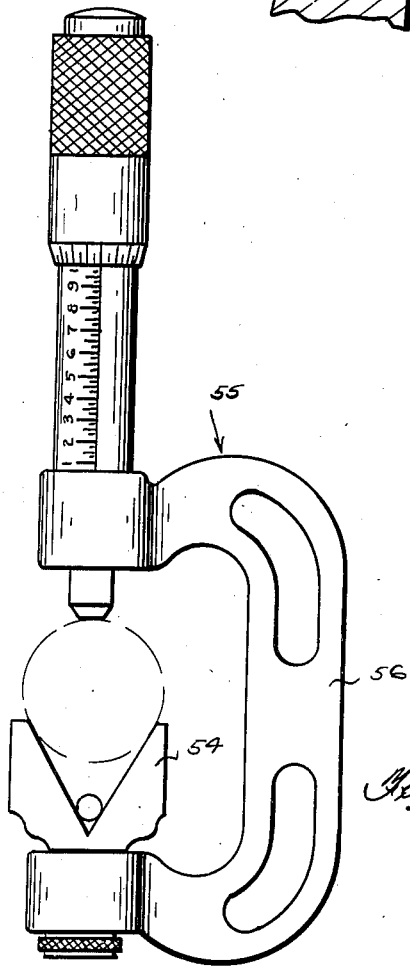
Fig. 11.

Patented Oct. 19, 1943

2,332,229

UNITED STATES PATENT OFFICE 2,332,229

MICROMETER

Cleveland H. Jelley, Detroit, Mich.

Application January 16, 1943, Serial No. 472,617

5 Claims. (Cl. 33—199)

My invention relates to improvements in micrometers, the principal object in view being to provide a direct reading, precision instrument to accurately determine, more particularly, so-called wire measurements of screw threads of various types and of three and five point implements, especially three and five flute taps.

Other and subordinate objects are also comprehended by my invention, all of which, together with the precise nature of my improvements, will be readily understood when the succeeding description and claims are read with reference to the drawings accompanying and forming part of this specification.

In said drawings:

Figure 1 is a view in side elevation of my improved micrometer in its preferred embodiment, Figure 2 is a view in plan, Figure 3 is a view in longitudinal section taken on the line 3—3 of Figure 2 and drawn to an enlarged scale, Figure 4 is a view in rear end elevation on the same scale as Figure 3, Figure 5 is a view in front end elevation.

Figure 6 is a view in transverse section taken on the line 6—6 of Figure 1 and drawn to an enlarged scale, Figure 7 is a similar view taken on the line 7—7 of Figure 1 and on the same scale as Figure 6, Figure 8 is a fragmentary view in longitudinal section taken on the line 8—8 of Figure 2 and drawn to an enlarged scale, Figure 9 is a view in transverse section taken on the line 9—9 of Figure 3, Figure 10 is a view in side elevation of an anvil forming part of the invention, and Figure 11 is a view in side elevation of a modified adaptation of the invention.

Referring to the drawings by numerals, my improved micrometer, in the preferred embodiment thereof illustrated in Figures 1 to 9, includes a frame 1 of the usual U-shaped type, with the exceptions presently noted. The frame 1 embodies a front end sleeve 2 and a rearwardly opening cylindrical, rear end, bearing socket 3 axially aligned with the sleeve 2 and having a square, reduced, front guide aperture 4 therein in the axis thereof.

A primary, tubular spindle 5 extends axially through the socket 3 and is provided on the front end thereof with an enlarged flat, rectangular head 6 having in the front face thereof a groove 7 intersecting the axis of the primary spindle 5 and arranged lengthwise in the plane of the frame 1. The primary spindle 5 is formed with a transversely square, front portion 8, and an externally threaded rear end portion 9. The front portion 8 is slidably fitted in the aperture 4 and forms therewith a spline connection between the bearing socket 3 and the primary spindle 5.

A tubular adjusting barrel 10 for the primary spindle 5 surrounds the rear portion of said spindle concentrically, said barrel 10 having an internally threaded rear end 11 turned onto the threaded end 9 of the primary spindle 5, and being internally threaded, as at 12, and of larger internal diameter from said end 11 thereof than the primary spindle 5. The spindle adjusting barrel 10 is rotatably and slidably fitted in a cylindrical operating thimble 13 having a beveled rear end 14, an internal, front end, annular flange 15 surrounding the primary spindle and clearing the same, and an external, annular flange 16 adjacent the front end thereof. The flanged front end of the operating thimble 13 is rotatably fitted in the bearing socket 3 with suitable anti-friction bearings 17 upon opposite sides of the flange 16 and so that said flanged end is rotatable concentrically about the primary spindle 5 and the barrel 10. A thimble locking nut 18 surrounds the operating thimble 13 and is threaded into the bearing socket 3. A dust excluding washer 19 is set into the nut 18 between the same and the operating thimble 13 and the nut 18. By tightening the nut 18 in said bearing socket 3, the operating thimble 13 may be adjusted for tension and to take up wear. An operating connection is provided between the operating thimble 13 and the barrel 10 in the form of a tubular screw member 20 in the operating thimble 13 and which is rotatable around the primary spindle 5, said member 20 having an enlarged front end 21 fitted tight, in any suitable manner, in the front end of said operating thimble for rotation thereby, and an internally threaded rear end section 22 mating with the threads 12 of the barrel 10.

A secondary spindle 23 of rod-like form is slidably and rotatably mounted in the primary spindle 5 to extend forwardly and rearwardly out of the same. A short thimble 24 is provided for adjusting the secondary spindle 23 endwise in the primary spindle 5, said thimble 24 extending rearwardly from the rear end of the barrel 10 and having a front end portion 25 with a beveled scale bearing edge telescoping over said barrel, a knurled intermediate shoulder 26 forming a hand grip, internal threads 27, and an axially bored rear externally threaded end 28 through which the rear end of the secondary spindle 23 is freely extended. The thimble 24 is adapted for endwise adjustment, under rotation thereof, on the barrel 10 by means of the threads 27 which mate with the threads of a coiler 29 adapted to be adjusted, as by screws 30, on a reduced shoulder 31 formed on the barrel 10. A second, cap-like, short thimble 32 is telescoped over the rear end of the thimble 24 and has a beveled front, scale bearing edge, said thimble 32 being internally threaded, as at 33, for turning to feed the same forwardly and rearwardly of the thimble 24, on the rear end 28 of the thimble 24 which is diametrically split as at 34 and provided with screws 35 for spreading apart to adjust the same. The secondary spindle 23 has a disk-like threaded rear end 36 turned into the rear end of the thimble 32 and fixed to said end by a screw 37. A nut 57 threaded onto the rear end of the member 20 locks the collar 29 in place.

In addition to the foregoing, V-type anvils are provided for mounting in the sleeve 2 of the frame 1, there being an anvil 38 having a notch 39 forming a 60 degree included angle for 3 flute taps or other tools, and an anvil 40 having a notch 41 also of V form and forming a 108 degree included angle for 5 flute or other tools. The anvils 38, 40 are provided each with a threaded shank 42 fitting in a bushing 43 threaded in the sleeve 2 and fixed therein by a set screw 44. A nut 45 threaded onto the shank 42 hold the anvil in place. The anvils, as shown in Figure 8, may be provided with a groove 46 transverse to the notch 39 and for a purpose presently seen.

As previously intimated, the instant invention is designed particularly for use in ascertaining the measurements of threads of taps, using wires. The practice, as is well known, in using wires for this purpose, involves inlaying wire slugs of predetermined diameter, according to the number of threads per inch, in the threads at different points to project out of said threads for micrometer diametrical measurements to ascertain the pitch diameter of the threads, which is found by formula and such formula becomes very complicated in computations relative to three, five, and seven flute taps because of the absence of any thread opposite any flute.

In the use of my improved micrometer, a tap 47, see Figure 1, is placed in the notch 39 of the anvil 38 with but one wire slug 48 arranged in the threads across the tap in the line of adjustment of the primary and secondary spindle 3, 23. As the barrel 10 is stationary by turning the thimble 13 in the proper direction, the screw 29 may be revolved to feed the barrel 10 forwardly and thereby adjust the primary spindle 3 to place the head 5 against the threads of the cap 47, with the notch 7 straddling the wire slug 48. The barrel 10 is provided with a longitudinal scale 49, and the beveled end 14 of the thimble 13 with a circular scale 50, both similar as in the usual micrometer, but the threads of the screw 29 are pitched and otherwise arranged to compensate for the increased distance between the apex of the notch 39 to the point on the tap being measured so that the scales 49 and 50 give the correct reading for the outside diameter of the threads of the tap. In the feeding of the primary spindle 5 forwardly, the secondary spindle 23 is also fed forwardly, since the thimbles 25 and 32 are carried by the barrel 10.

The function of the secondary spindle 23 is to ascertain the correctness of the pitch diameter over the wire 48 and this spindle is adjusted forwardly against the wire slug 48 by rotation of the thimble 24 to feed the same forwardly on the collar 29, together with the thimble 32, whereby the secondary spindle 23 is adjusted forwardly in the primary spindle 5. The thimble 25 is provided on its front beveled end with a circumferential scale 51 to be read against the line 52 of the scale 49, and this scale 51 is numbered and graduated to read zero against said line 52 for tap threads having correct pitch diameter and outside diameter, but to give plus or minus readings on either side of zero where the pitch diameter is in error one way or the other.

The function of the thimble 32 is to adjust the secondary spindle 23 for measuring with correct readings in the use, within a wide range, of wire slugs of different diameters, and by adjusting said spindle 23 independently of other adjustments. The threads of the thimble 32 are pitched and the beveled front end of said thimble is graduated, as at 53, to set the spindle 23 for wires of different diameters so that under adjustment of the secondary spindle 23 against the wire slug 48, by means of the thimble 25, the scale 51 will give the correct pitch reading of zero, or positive or minus variations, from the outside diameter ascertained by means of the primary spindle 5. Of course, as will be understood, all the scales identified in the foregoing have micrometric features. The slot 46 in the anvil 38, or 40, is to permit the use of a wire slug across the tap if the tap is of such small diameter that it completely enters the notch 39.

As shown in Figure 11, an anvil 54, similar to those described, may be used in the single spindle micrometer 55 for measuring purposes, said anvil being mounted in the frame 56 in the same manner as previously described with reference to the preferred embodiment of my invention.

The foregoing will, it is believed, suffice to impart a clear understanding of my invention without further explanation.

Manifestly, the invention, as described, is susceptible of modification both as regards structural details and arrangement of parts, without departing from the inventive concept, and right is herein reserved to such modifications as fall within the scope of the appended claims.

What I claim is:

1. In a micrometer, a frame, a hollow primary measuring spindle endwise adjustable in said frame and having a spline connection therewith to prevent rotation thereof in said frame, a secondary measuring spindle endwise slidable and rotatable in the primary spindle to adjust the same independently relative to the primary spindle, said secondary spindle being adjustable in unison with said primary spindle, means to adjust said spindles in unison, and means to adjust the secondary spindle independently.

2. In a micrometer, a frame, a hollow primary measuring spindle endwise adjustable in said frame and having a spline connection therewith to prevent rotation thereof in said frame, a secondary measuring spindle endwise slidable and rotatable in the primary spindle to adjust the same independently relative to the primary spindle, said secondary spindle being adjustable in unison with said primary spindle, means to adjust said spindles in unison, and means to adjust the secondary spindle independently, the first-mentioned means comprising a tubular thimble surrounding said spindles and having one end rotatably mounted in said frame, a barrel telescoping in said thimble in surrounding relation to said spindles and coupled to the primary spindle, and a tubular screw member extending into said thimble in surrounding relation to said spindles, said member having one end coupled to said thimble and the other end thereof threaded into said barrel.

3. In a micrometer, a frame, a hollow primary measuring spindle endwise adjustable in said frame and having a spline connection therewith to prevent rotation thereof in said frame, a secondary measuring spindle endwise slidable and rotatable in the primary spindle, to adjust the same independently relative to the primary spindle, said secondary spindle being adjustable in unison with said primary spindle, means to adjust said spindles in unison, and meas to adjust the secondary spindle independently, said primary spindle having a grooved head through which the secondary spindle is adjustable.

4. In a micrometer, a frame, a hollow primary measuring spindle endwise adjustable in said frame and having a spline connection therewith to prevent rotation thereof in said frame, a secondary measuring spindle endwise slidable and rotatable in the primary spindle to adjust the same independently relative to the primary spindle, said secondary spindle being adjustable in unison with said primary spindle, means to adjust said spindles in unison, and means to adjust the secondary spindle independently, the first-mentioned means comprising a tubular thimble surrounding said spindles and having one end rotatably mounted in said frame, a barrel telescoping in said thimble in surrounding relation to said spindles and coupled to the primary spindle, and a tubular screw member extending into said thimble in surrounding relation to said spindles, said member having one end coupled to said thimble and the other end thereof threaded into said barrel, the second-mentioned means including a second thimble having a threaded connection with one end of said barrel and devices connecting said second thimble to the secondary spindle.

5. In a micrometer, a frame, a hollow primary measuring spindle endwise adjustable in said frame and having a spline connection therewith to prevent rotation thereof in said frame, a secondary measuring spindle endwise slidable and rotatable in the primary spindle to adjust the same independently relative to the primary spindle, said secondary spindle being adjustable in unison with said primary spindle, means to adjust said spindles in unison, and means to adjust the secondary spindle independently, the first-mentioned means comprising a tubular thimble surrounding said spindles and having one end rotatably mounted in said frame, a barrel telescoping in said thimble in surrounding relation to said spindles and coupled to the primary spindle, and a tubular screw member extending into said thimble in surrounding relation to said spindles, said member having one end coupled to said thimble and the other end thereof threaded into said barrel, the second-mentioned means including a second thimble having a threaded connection with one end of said barrel and devices connecting said second thimble to the secondary spindle, said devices comprising a third thimble threaded onto the second thimble for adjustment thereon and connected to the secondary spindle for adjustment of the secondary spindle therewith.

CLEVELAND H. JELLEY.